United States Patent [19]

Kashkina et al.

[11] 3,723,401
[45] Mar. 27, 1973

[54] POLYMERIC DERIVATIVE OF 1-PHENYLISOPROPYLAMINE WITH CARBOXYFORMAL OF POLYVINYL ALCOHOL, METHOD OF PRODUCING AND APPLICATION THEREOF

[75] Inventors: Nadezhda Alexandrovna Kashkina; Milda Yanovna Pormale; Arvid Yanovich Kalninsh; Yan Alexandrovich Surna; Yanis Yanovich Baltkajs; Yan Shuster, all of Riga, U.S.S.R.

[73] Assignee: Institut Khimii Drevesiny Akademii Nauk Latuiiskoi SSR

[22] Filed: Sept. 11, 1970

[21] Appl. No.: 71,340

[52] U.S. Cl. ............................. 260/91.3 VA, 424/78
[51] Int. Cl. ............................................. C08f 27/08
[58] Field of Search ........................... 260/91.3 VA

[56] References Cited

FOREIGN PATENTS OR APPLICATIONS 991,941   5/1965   Great Britain ................ 260/91.3 VA Primary Examiner—James A. Seidleck
Assistant Examiner—Stanford M. Levin
Attorney—Waters, Roditi, Schwartz & Nissen

[57] ABSTRACT

The present invention relates to a new compound which is a polymeric derivative of 1-phenylisopropylamine with carboxyformal of polyvinyl alcohol, to a method of their producing and application.

Said polymeric derivative of 1-phenylisopropylamine with carboxyformal of polyvinyl alcohol conforms to the general formula

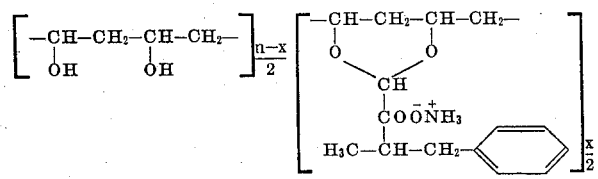

where $n$ is polymerization degree from 100 to 1,200, and $x$ is substitution degree, in mol. percent, from 3 to 25.

The method of the invention for producing said polymeric derivative of 1-phenylisopropylamine with carboxyformal of polyvinyl alcohol consists in that carboxyformal of polyvinyl alcohol is reacted with 1-phenylisopropylamine in an aqueous medium, and the desired product is subsequently isolated.

Said compound is an active principle of a medicinal preparation of a psycho-stimulating effect.

3 Claims, No Drawings

POLYMERIC DERIVATIVE OF 1-PHENYLISOPROPYLAMINE WITH CARBOXYFORMAL OF POLYVINYL ALCOHOL, METHOD OF PRODUCING AND APPLICATION THEREOF

The present invention relates to a new compound which is a polymeric derivative of 1-phenylisopropylamine with carboxyformal of polyvinyl alcohol, to a method of its production and application.

The new compound, according to the invention, has the following general formula:

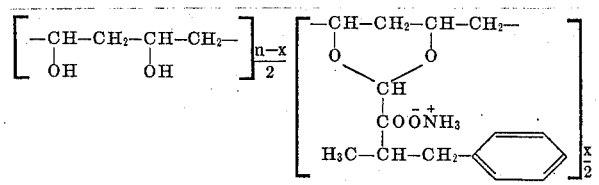

where $n$ is polymerization degree from 100 to 1,200, and $x$ is substitution degree, in mol. percent, from 3 to 25.

The substance proposed herein is a white or slightly yellowish hygroscopic powder, readily soluble in water and insoluble in organic solvents.

Said polymeric derivative of 1-phenylisopropylamine with carboxyformal of polyvinyl alcohol features pharmacological activity and, according to the invention is an active principle of a medicinal preparation with a psycho-stimulating effect.

In the mechanism of its action the said preparation does not differ from phenamine sulphate and belongs to the group of sympathomimetic phenylalkylamines. Said preparation features greater activity and more prolonged action than phenamine. The comparative studies of the stimulating properties of the proposed preparation with respect to the central nervous system were carried out with the help of actometry techniques.

The experiments were made on white mice over a period of 6 hours. Solutions of both preparations were administered to the mice intra-abdominally in a dose of 10.0 mg/kg as calculated for phenamine sulphate.

After the injection of the preparations, the mice were placed into chambers of an actometer, and 5 min. later their motor activity was started to be registered. The data on the motor activity were recorded for each mouse every hour, and mean motor activity for the group of animals was calculated. The actometry data thus obtained showed, that the administration of the present preparation causes a pronounced and durative increase in the motor activity of white mice. 6 hours after the administration of the preparation, the motor activity of the white mice was 1,011 movements per hour, and after the administration of phenamine sulphate their activity was 456 movements per hour. The toxicity of the herein-proposed preparation does not differ from that of phenamine sulphate. The proposed preparation is applicable, mainly, in cases of psychoneuralgia, when treating psychogenic depressions, narcolepsy, postencephalitis, alcoholic-depressive psychoses, and other disorders accompanied by somnolence, anergy, apathy, asthenia; the preparation can also be used for overcoming fatigue and for temporary promotion of physical and mental activity of sound persons.

The preparation is used as powders and tablets. The content of the active principle in tablets is 0.015–0.085 g. The preparation is used once a day in doses of 0.015–0.085 g.

Overdosage of the preparation may cause loss of appetite, insomnia. The preparation is contraindicated in cases of insomnia, excitement and liver disorders.

The method of producing said polymeric derivative of 1-phenylisopropylamine with carboxyformal of polyvinyl alcohol, according to the invention, consists in reacting carboxyformal of polyvinyl alcohol with 1-phenylisopropylamine in an aqueous medium, followed by isolation of the desired product.

For producing a high-quality desired product, carboxyformal of polyvinyl alcohol and 1-phenylisopropylamine should be taken in equimolecular quantities.

The process is carried out at room temperature, under stirring. For the reaction carboxyformal of polyvinyl alcohol is used with substitution degree from 3 to 25 mol. percent. 1-Phenylisopropylamine adds to the carboxyformal of polyvinyl alcohol via the salt bond. The yield of the desired product is 96.8 wt. percent.

For a better understanding of the present invention, given hereinbelow is an example, illustrating the realization of the method of producing the herein-proposed derivative of 1-phenylisopropylamine with oxyformal of polyvinyl alcohol.

EXAMPLE

The starting product, that is, carboxyformal of polyvinyl alcohol, can be prepared in the following fashion.

A 250 ml flask equipped with a reflux condenser, a mechanical stirrer and a thermometer is charged with 70 ml of a 8 percent aqueous solution of polyvinyl alcohol having m.w. of 30,000, with 25 ml of a 10.12 percent aqueous solution of glyoxalic acid, and with 100 ml of 5.6 M sulphuric acid. The reaction solution is heated at a temperature of 60° C on a water bath during 40 hours. Then the resulting gelatinous reaction mass is dialyzed with distilled water during 96 hours. The resulting aqueous solution of carboxyformal of polyvinyl alcohol is concentrated by vacuum distillation of water. The concentration of the polymer in the solution is determined by drying a weighed portion of the polymer solution in a vacuum-drier at a temperature of 50° C to constant weight. The concentration of the polymer is 5.4 wt. percent.

The content of COOH-groups in the polymer is determined by potentiometric titration of the obtained aqueous solution of carboxyformal of polyvinyl alcohol with a 0.02N aqueous solution of caustic soda. The polymer contains 15.9 percent of COOH-groups.

Into 60 ml of the obtained solution of carboxyformal of polyvinyl alcohol (3.28 g of the polymer with the degree of conversion of OH-groups to COOH-groups equal to 15.9 mol. percent) there is poured a solution of 0.7340 g of 1-phenylisopropylamine in 40 ml of distilled water, under intensive stirring, and then the stirring is continued at room temperature during 1 hour. The concentration of the 1-phenylisopropylamine attached to the polymer via the salt bond in the solution is 7.34 mg/ml, which corresponds to 10.0 mg/ml of 1-phenylisopropylamine sulphate. Then the obtained solution is lyophilically dried.

3.89 g of the desired product are obtained (96.8 wt. percent of the theoretical amount). The content of 1-phenylisopropylamine in the dry product is calculated by the results of nitrogen analysis (following a modified Dumas method).

calc., %: N, 1.90; 1-phenylisopropylamine, 18.28.
Found, %: N, 1.84; 1-phenylisopropylamine, 17.74.

What is claimed is:

1. A polymeric derivative of 1-phenylisopropylamine with carboxyformal of polyvinyl alcohol, conforming to the general formula

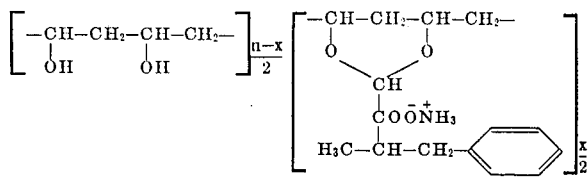

where $n$ is polymerization degree from 100 to 1,200, and $x$ is substitution degree, in mol. percent, from 3 to 25.

2. A method of producing a polymeric derivative of 1-phenylisopropylamine with carboxyformal of polyvinyl alcohol, conforming to the general formula

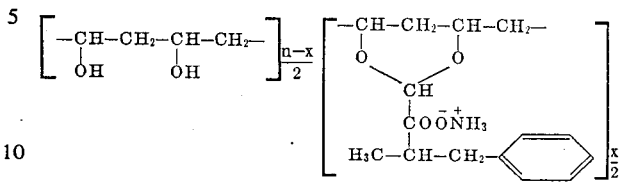

where n is polymerization degree from 100 to 1,200, and $x$ is substitution degree, in mol. percent, from 3 to 25, consisting in that carboxyformal of polyvinyl alcohol is reacted with 1-phenylisopropylamine with stirring in an aqueous medium at room temperature, and the desired product is subsequently isolated.

3. A method as claimed in claim 2, wherein carboxyformal of polyvinyl alcohol and 1-phenylisopropylamine are taken in equimolecular quantities.

* * * * *